United States Patent
Kubota et al.

(10) Patent No.: US 6,836,306 B2
(45) Date of Patent: Dec. 28, 2004

(54) TRANSFLECTIVE LIQUID CRYSTAL DISPLAY DEVICE

(75) Inventors: Hirofumi Kubota, Nishinomiya (JP); Naohide Wakita, Suita (JP); Tsuyoshi Uemura, Kadoma (JP); Sadayoshi Hotta, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/753,395

(22) Filed: Jan. 9, 2004

(65) Prior Publication Data

US 2004/0145691 A1 Jul. 29, 2004

Related U.S. Application Data

(63) Continuation of application No. 10/130,720, filed as application No. PCT/JP01/08463 on Sep. 27, 2001, now Pat. No. 6,771,334.

(30) Foreign Application Priority Data

Sep. 27, 2000 (JP) .................................. 2000-293806
Nov. 10, 2000 (JP) .................................. 2000-343268

(51) Int. Cl.[7] .................. G02F 1/1335; C09K 19/02
(52) U.S. Cl. .................. 349/114; 349/118; 349/179
(58) Field of Search .................. 349/114, 118, 349/179

(56) References Cited

U.S. PATENT DOCUMENTS

| | | | |
|---|---|---|---|
| 4,582,396 A | 4/1986 | Bos et al. | 349/180 |
| 6,144,431 A | 11/2000 | Yamahara et al. | 349/117 |
| 6,195,140 B1 | 2/2001 | Kubo et al. | 349/44 |
| 6,281,952 B1 | 8/2001 | Okamoto et al. | 349/12 |
| 6,330,047 B1 | 12/2001 | Kubo et al. | 349/147 |
| 6,563,554 B2 | 5/2003 | Okamoto et al. | 349/12 |
| 2003/0151712 A1 * | 8/2003 | Inoue et al. | 349/139 |

FOREIGN PATENT DOCUMENTS

| | | |
|---|---|---|
| JP | 07-318929 | 12/1995 |
| JP | 09-101497 | 4/1997 |
| JP | 11-109417 | 4/1999 |
| JP | 11-242226 | 9/1999 |

* cited by examiner

Primary Examiner—Dung T. Nguyen
(74) Attorney, Agent, or Firm—Parkhurst & Wendel, L.L.P.

(57) ABSTRACT

A transflective liquid crystal display device having excellent display quality is provided which is capable of precisely controlling the alignment of liquid crystal molecules and of providing a high brightness display both in a transmissive display mode and in a reflective display mode. The transflective liquid crystal display panel has a pair of substrates, a liquid crystal layer sandwiched between the substrates, pixel electrodes disposed on the surface of one of the substrates facing the liquid crystal layer, a counter electrode disposed on the surface of the other substrate facing the liquid crystal layer, and an alignment film covering the surface of each of the substrates facing the liquid crystal layer. The pixel electrodes, each including an electrode for reflective display and an electrode for transmissive display, are disposed such that the distances to the other substrate from the electrode for reflective display and from the electrode for transmissive display are different. Liquid crystal molecules at the liquid crystal layer surface facing the electrode for reflective display in a region above the electrode for reflective display (reflective display region) are aligned in the same direction as liquid crystal molecules in a region above the electrode for transmissive display (transmissive display region) that are in the same plane as the molecules in the reflective display region, the plane being parallel to the principal surfaces of the substrates.

23 Claims, 10 Drawing Sheets

Reflective Display Region | Transmissive Display Region | Reflective Display Region Reflective Display Region | Transmissive Display Region | Reflective Display Region

TRANSFLECTIVE LIQUID CRYSTAL DISPLAY DEVICE

This is a Continuation of application Ser. No. 10/130,720 filed May 23, 2002, now U.S. Pat. No. 6,771,334 which in turn is based upon PCT/JP01/08463 filed Sep. 27, 2001.

TECHNICAL FIELD

The present invention relates to transflective liquid crystal display devices and more specifically to improvement of such devices for achieving enhanced display quality.

BACKGROUND ART

Liquid crystal display devices have become widely spread in recent years because of their advantages such as the ability to make thinner devices and offer lower power consumption than display devices that utilize cathode ray tubes.

Liquid crystal display devices are generally divided into two types: a transmissive type and a reflective type.

The transmissive liquid crystal display device utilizes light irradiated from a so-called backlight to provide a display and is widely used as the display for word processors, notebook personal computers and the like. When the transmissive liquid crystal display device is utilized in environments where the intensity of incident light on the device is high, such as the outdoors, it is difficult to observe a normal display.

The reflective liquid crystal display device reflects outside light and utilizes the light to provide a display and thus does not have a backlight, which, in turn, offers lower power consumption than the transmissive type. Accordingly, with the rapid spread of portable equipment, the reflective liquid crystal display device is receiving wide attention as the display for such equipment. The reflective liquid crystal display device is capable of providing a satisfactory display in environments with strong outside light, such as the outdoors, but incapable of providing a normal display in environments where the intensity of incident light on the device is low, such as nighttime.

Hence, a so-called transflective liquid crystal display device having the functions of both the transmissive and reflective liquid crystal display devices is receiving attention. For example, Japanese Unexamined Patent Publication No. 7-318929 suggests a liquid crystal display device that utilizes a substrate having a transflective reflecting film on the rear side thereof. In addition, Japanese Unexamined Patent Publication No. 11-109417 suggests a liquid crystal display device having pixels which include both transmissive and reflective electrodes.

The transflective liquid crystal display device exhibits excellent visibility regardless of the brightness of the environment in which it is used, but on the other hand, the device has lower brightness than the transmissive and reflective liquid crystal display devices and is lack of the colorfulness of the image. For example, in a transflective liquid crystal display device having both transmissive and reflective electrodes, by increasing the ratio of the area occupied by the reflective electrodes and increasing the intensity of the backlight, the display brightness can be increased both in a reflective display mode and in a transmissive display mode. These measures, however, contribute to an increase in the amount of power consumption in the transmissive display mode, resulting in the loss of the advantage of low power consumption provided by the liquid crystal display device. Furthermore, as is suggested in the above publication, in a display mode such that the backlight is driven all the time and a reflective display is complemented by a transmissive display, an excellent image display can be realized even in bright environments but a power consumption equal to or higher than that of the transmissive liquid crystal display device is required. That is, this leads to the loss of the advantage of low power consumption provided by the reflective display mode.

While in the transmissive display mode, light irradiated from the backlight is transmitted through the liquid crystal layer only once, in the reflective display mode, incident light is transmitted though the liquid crystal layer twice, before and after reflecting at a reflecting means such as reflective electrodes. There is a demand to reduce variations in display quality due to the optical path difference between the two modes. Hence, Japanese Unexamined Patent Publication No. 11-242226 suggests a transflective liquid crystal display device in which the alignment of liquid crystal molecules in reflective display regions is different from the alignment of liquid crystal molecules in transmissive display regions. However, when, as is suggested in the above-described publication, a plurality of regions having liquid crystal molecules whose alignments vary from region to region are provided, the alignment of the liquid crystal molecules becomes discontinuous at the boundaries between the regions, resulting in formation of so-called disclination lines. The liquid crystal molecules in those regions suffer from alignment defects, ending up not contributing at all to a normal display or requiring a long period of time to obtain an intended alignment.

Moreover, as was described above, in the transmissive display mode, light irradiated from the backlight is transmitted through the color filter only once, and in the reflective display mode, incident light is transmitted through the color filter twice, before and after reflecting at a reflecting means such as reflective electrodes, and thus variations in the hue of display occur between the two modes. The above-described publication also suggests that the device provides a color display only in transmissive display portions and in reflective display portions a non-color display is provided. Specifically, color filters are provided in the transmissive display regions, and light in the reflective display portions only contributes to the pixel lightness. This technique, however, has difficulty providing a display with higher brightness because the brightness of the pixels is controlled only by the area of the transmissive display portions.

Hence, there has been a demand for transflective liquid crystal display devices capable of providing a display with higher image quality while maintaining the advantage of power-saving features provided by the liquid crystal display device.

For the liquid crystal display device, generally, an improvement in the display quality of the moving images, i.e., in response time, and an increase in viewing angle are demanded. Thus, optically compensated bend (OCB) mode liquid crystal display devices having excellent response time and viewing angle are receiving attention. In the OCB mode liquid crystal display panel, when a voltage is not applied between a pixel electrode 103 on an array substrate 102 and a counter electrode 106 on a counter substrate 105, liquid crystal molecules 100 exhibit a splay alignment as shown in FIG. 13a, and when a voltage is applied, the liquid crystal molecules exhibit a bend alignment as shown in FIG. 13b. In addition, as the driving mode for the reflective liquid crystal display device, a reflective OCB (R—OCB) mode is suggested. As is shown in FIG. 14, in the R—OCB mode, a liquid crystal molecule on the side of one of the electrodes exhibits a hybrid alignment such that the long axis of the liquid crystal molecule is oriented perpendicular to a surface of the reflective electrode, while a liquid crystal molecule on the side of the other electrode exhibits a bend alignment.

In the transmissive liquid crystal display device, the so-called field-sequential technique, which eliminates the need to use color filters, is widely studied. For example, Japanese Unexamined Patent Publication No. 9-101497 suggests a TN mode liquid crystal display device with a backlight made up of three color tubes of R (red), G (green), and B (blue) in which each of the R, G, and B tubes is sequentially turned on at regular intervals.

DISCLOSURE OF THE INVENTION

It is an object of the present invention to provide a liquid crystal display device having excellent display quality and capable of precisely controlling the alignment of liquid crystal molecules and of providing a display with high brightness and high color purity both in a transmissive display mode and in a reflective display mode.

According to the present invention, there is provided a transflective liquid crystal display panel including: a pair of substrates; a liquid crystal layer sandwiched between the substrates; pixel electrodes disposed on a surface of one of the substrates facing the liquid crystal layer; a counter electrode disposed on a surface of the other substrate facing the liquid crystal layer; and an alignment film covering the surface of each of the substrates facing the liquid crystal layer, wherein the pixel electrodes, each including an electrode for reflective display and an electrode for transmissive display, are disposed such that the distances to the other substrate from the electrode for reflective display and the electrode for transmissive display are different; and wherein liquid crystal molecules at the liquid crystal layer surface facing the electrode for reflective display in a region above the electrode for reflective display (reflective display region) are aligned in the same direction as liquid crystal molecules in a region above the electrode for transmissive display (transmissive display region) that are in the same plane as the molecules in the reflective display region, the plane being parallel to the principal surfaces of the substrates.

When the alignment of the liquid crystal molecules facing the electrode for reflective display is the same as the alignment of the liquid crystal molecules in the transmissive display region that are located in the same plane as the molecules facing the electrode for reflective display, it is possible to prevent formation of a liquid crystal boundary where the molecular alignment is discontinuous, which in turn prevents formation of disclination lines, and the diving of the liquid crystal molecules can be controlled with good response time, making it possible to obtain a liquid crystal display device with excellent display quality of moving images.

The present invention can be applied to liquid crystal display devices of various driving modes such as a twisted nematic (TN) mode and an optically compensated bend (OCB) mode.

For example, the liquid crystal layer in the transmissive display region is made thicker than the liquid crystal layer in the reflective display region, and the transmissive display region and the reflective display region are driven in the OCB mode and the R—OCB mode, respectively. With this combination, the alignment of the liquid crystal molecules between the two regions can be made substantially uniform and also the variations in the hue of the pixel display between the two display modes can be minimized.

Generally, the electrode for reflective display and the electrode for transmissive display are formed in different layers on the same substrate, and therefore the thickness of the liquid crystal layer in a region where the electrode for reflective display is disposed is different from that of the liquid crystal layer in a region where the electrode for transmissive display is disposed. Hence, in order to prevent formation of disclination lines, it is preferable that the alignment films disposed in such regions be treated so that the alignment of the liquid crystal molecules in contact therewith is different in each region.

A plurality of regions having different alignment directions can be easily formed by using a so-called photo-alignment film. Specifically, by irradiating a photo-curing monomer or prepolymer film with ultraviolet light using a mask, regions having desired alignment directions can be formed. By performing back exposure using the reflective portion as a mask, a multi-domain liquid crystal layer can be obtained in a self-aligned manner. In addition, a plurality of similar regions can also be formed by a rubbing process using a mask.

In the liquid crystal display device of the TN mode, a spontaneous twist in the alignment of liquid crystal molecules can be applied which is induced by addition of a chiral material to the liquid crystal layer. When an alignment film provided with a uniform alignment treatment is formed on a surface of one of the substrates, preferably the counter substrate having a flatter surface, in contact with the liquid crystal layer, liquid crystal molecules in contact with the alignment film spontaneously exhibit a desired alignment without the need to provide an alignment treatment on a surface of the other substrate.

Moreover, the liquid crystal alignment film allows liquid crystal molecules to transition from a vertical alignment to a horizontal alignment by light irradiation, and thus a panel in which the transmissive portion is in the OCB mode and the reflective portion is in the R—OCB mode can be easily obtained.

Here, it is possible to allow a display in the reflective display region to be normally black and a display mode in the transmissive display region to be normally white. In addition, when a structure for promoting easier transition from a splay alignment to a bend alignment upon driving is provided in the transmissive display region, alignment defects can be further reduced. Such a structure includes protrusions of various shapes. Since the protruding portions are weak in terms of the ability to control alignment, the alignment of liquid crystal molecules easily becomes unstable and thus the above-described alignment transition can be promoted. It should be noted that the alignment of liquid crystal molecules can be more effectively transitioned from a splay alignment to a bend alignment by providing regions having different alignment directions locally in the alignment film.

When the electrode for transmissive display is disposed lower than the electrode for reflective display and further a color filter layer is formed so as to cover the electrodes, the color filter layer in the reflective display region can be made thinner than that in the transmissive display region. For example, the thickness of the color filter in the transmissive display is made twice the thickness of the color filter in the reflective display region. By disposing the filter having different thicknesses in the transmissive display region and the reflective display region, the hue variations between the two display modes due to the optical path difference in the color filter layer can be corrected and thus the color reproducibility is significantly improved.

It is preferable that protrusions be provided in the reflective display region for scattering incident light and increasing the viewing angle. In addition, in the case where the pixel electrodes are disposed on an uneven surface, when the electrode for transmissive display is disposed in a flat region, where the scattering function is low and a contribution to an increase in the viewing angle is small, and the electrode for reflective display is disposed above the protrusions, a high scattering performance and a high transmittance can be obtained.

The electrode for reflective display is preferably formed in the upper layer, as was described above, to minimize the optical path difference. When the electrode for reflective display is disposed in the layer upper than the electrode for transmissive display and than switching elements such as thin film transistors so as to cover the switching elements, a displayable region can also be secured even on the switching elements, making it possible to provide a high brightness display.

Furthermore, according to the present invention, by employing the so-called field-sequential technique for transmissive display, a display with high brightness and good image quality can be realized both in the transmissive display mode and in the reflective display mode.

For example, there is provided a transflective liquid crystal display panel including: a pair of substrates; a liquid crystal layer sandwiched between the substrates; pixel electrodes disposed on a surface of one of the substrates facing the liquid crystal layer; a counter electrode disposed on a surface of the other substrate facing the liquid crystal layer; an alignment film covering the surface of each of the substrates facing the liquid crystal layer; and a light source, wherein color filters are disposed so as to oppose to the pixel electrode for reflective display and wherein while in a reflective display mode a color display is realized by coloring light using the color filters as is the case with conventional display devices, in a region corresponding to the electrode for transmissive display color filters are not disposed and thus light is colored by other means in a transmissive display mode. Although in the region corresponding to the electrode for transmissive display the color filters or other alternatives thereto are not disposed, a non-color layer is disposed instead of the color filters.

That is to say, in the transmissive display mode, a color display can be realized using a color time division light source instead of the color filter. By employing a field sequential technique, a high brightness display can be realized in the transmissive display mode. With the field sequential technique which does not require color filters, there is no need to concern about a reduction in intensity due to reflection and the like caused by the color filter. Thus, a display with higher brightness can be obtained than the case with the color filter, without increasing the intensity of the backlight, i.e., without increasing the power consumption. In addition, it becomes possible to display the pixels with an arbitrary RGB color. Consequently, the ratio of the area occupied by the electrode for reflective display can be increased and thus a high brightness display can be realized in the reflective display mode as well as in the transmissive display mode. Thereby, it is possible to obtain a liquid crystal display device capable of displaying excellent images with low power consumption, regardless of the brightness of the surrounding environments and the like.

For the color filter layer, color-variable color filters whose colors are changed by an external input can also be used in addition to common monochromatic filters. For example, by using a cholesteric liquid crystal, light of specified wavelengths is reflected. When the color-variable color filters are driven on a time division basis in accordance with the light source, the pixels can display an arbitrary RGB color and thus the brightness is increased. In addition, when the color of the color filter layer in the reflective display region is changed in accordance with the color of light irradiated from the light source, in the transmissive display mode, even if outside light enters, color mixing does not occur between the reflective display region and the transmissive display region, and thus high color reproducibility is achieved. In particular, when the color of the color filter layer is changed so that the peak wavelength of light emitted from the color time division light source substantially corresponds to a wavelength at which the color filter exhibits its peak transmittance, the color purity is the same in the reflective display region and the transmissive display region, and thus an excellent display can be obtained.

Generally, color filter layers used for the reflective panel have a transmittance of as high as approximately 70%. Thus, even light, which does not have corresponding wavelengths, transmits through individual RGB pixels. When a color filter layer, similar to that used for reflective display, is disposed in the transmissive display region and monochromatic light irradiated from the color time division light source is allowed to transmit through the color filter layer, it is also possible to obtain high brightness.

For the light source, a light emitting diode (LED) or an electroluminescent device which exhibits emission line peaks with small half widths is preferably used.

Furthermore, a transflective liquid crystal display device with high brightness is realized without employing a field-sequential technique.

There is provided a transflective liquid crystal display device including: a pair of substrates; a liquid crystal layer sandwiched between the substrates; pixel electrodes disposed on a surface of one of the substrates facing the liquid crystal layer, each of the pixel electrodes including an electrode for reflective display and an electrode for transmissive display; a counter electrode disposed on a surface of the other substrate facing the liquid crystal layer; an alignment film covering the surface of each of the substrates facing the liquid crystal layer; a color filter layer disposed so as to oppose to the pixel electrodes; and a light source for irradiating the liquid crystal layer with light through the electrode for transmissive display, wherein the light source irradiates, for example, white light having emission line peaks of R, G, and B which substantially correspond to wavelengths at which transmittance of the color filter layer exhibits a peak. When the peak value of the emission wavelength of the light source and the peak value of the transmission wavelength of the color filters are made substantially the same, color variations between a reflective state and a transmissive state are minimized. Here, when such a light source that emits light with a line spectrum is used as the light source, color mixing in RGB pixels can be reduced. By using a light source that emits a bright-line spectrum so that the peak wavelengths of light emission of R, G, and B go through only the transmission wavelength range of the corresponding color filters, the color purity is improved.

It should be noted that in the case of using a substrate made of a synthetic resin with a thickness of as thin as about 0.1 to 0.4 mm, even if the color filter layer is formed on an outer surface of the substrate, parallax is small and thus visibility is not reduced.

A light guiding plate for irradiating the liquid crystal layer with light projected from the light source preferably has a configuration in which the light is emitted only towards the electrode for transmissive display and not towards a region other than that. For example, the light guiding plate is such that V-shaped or sawtooth-shaped slots for emitting light are provided in regions corresponding to the electrodes for transmissive display and regions other than such regions are flat so that total reflection of light occurs on the internal surface thereof. Using a substrate made of a synthetic resin facilitates the processing of slots such as those described above.

Moreover, for carrying out a color time division driving, it is preferable that the response time of the liquid crystal layer be great, such as a few milliseconds. For example, an OCB mode, a ferroelectric liquid crystal mode, an antiferroelectric liquid crystal mode or the like is utilized.

BRIEF DESCRIPTION OF THE DRAWINGS

FIG. 13(a) shows a splay alignment with no voltage applied and FIG. 13(b) shows a bend alignment with a voltage applied.

BEST MODE FOR CARRYING OUT THE INVENTION

Preferred examples of the present invention will be described in detail below with reference to the drawings.

EXAMPLE 1

The present example shows an example of a transflective liquid crystal display device that allows liquid crystal molecules of a liquid crystal layer in the same plane to be aligned uniformly.

A liquid crystal display device of the present example is of a so-called twisted nematic (TN) type.

Figure 1:
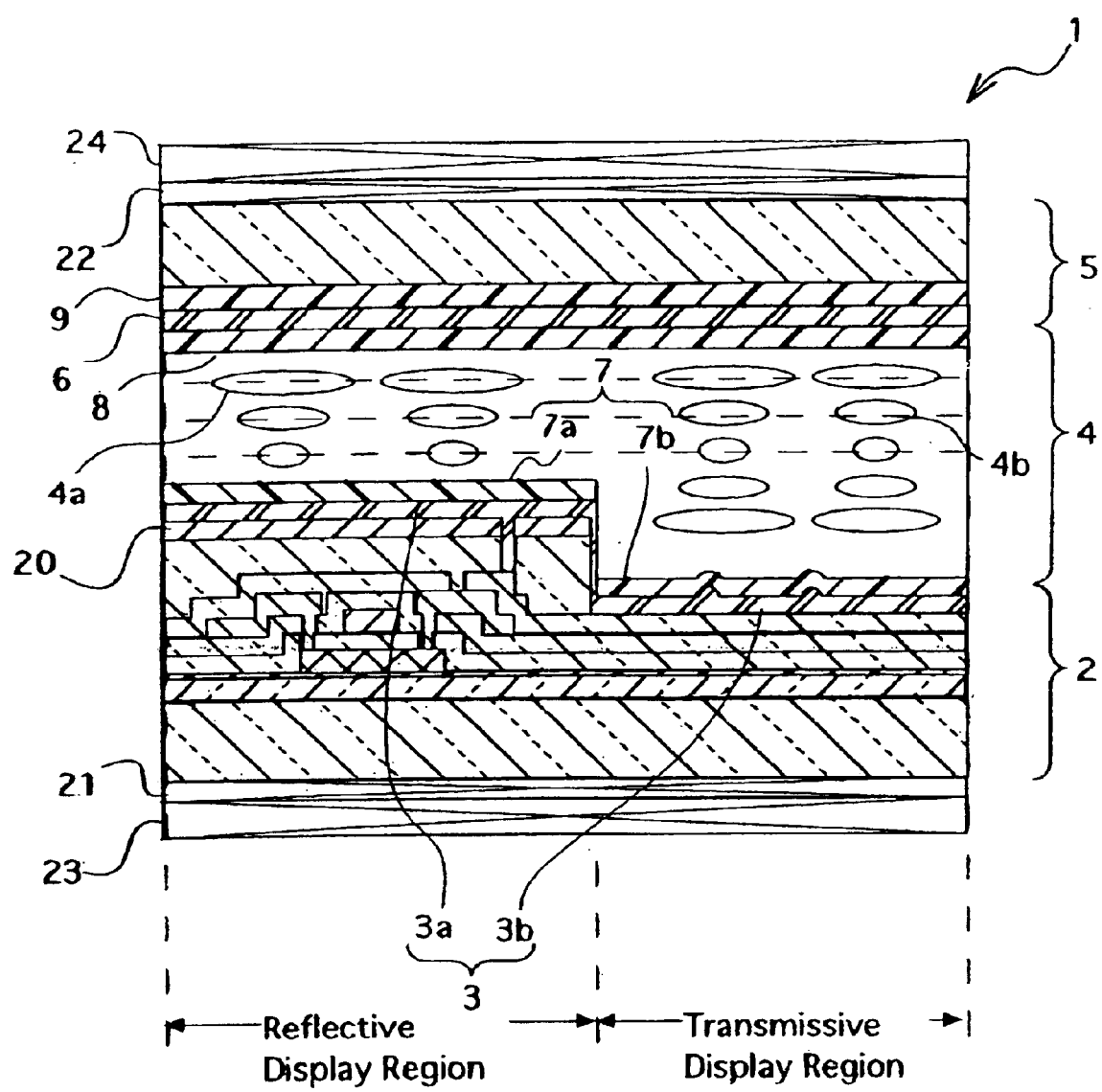
FIG. 1 is a schematic longitudinal section showing the main part of a transflective liquid crystal display device of one example of the present invention.

As shown in FIG. 1, on an array substrate 2 of a liquid crystal display device 1, an electrode for reflective display 3a and an electrode for transmissive display 3b, serving as a pixel electrode 3, are disposed. The electrode for reflective display 3a and the electrode for transmissive display 3b are made of, for example, indium tin oxide (ITO), and a reflective layer 20 is formed underneath the electrode for reflective display 3a.

On a counter substrate 5 arranged opposite the array substrate 2 with a liquid crystal layer 4 interposed between the substrates, a transparent counter electrode 6 made of, for example, ITO and a color filter layer 9 are disposed. The thickness of the liquid crystal layer 4 in a region where the electrode for reflective display 3a is disposed, i.e., in a reflective display region, is smaller than that of the liquid crystal layer 4 in a region where the electrode for transmissive display 3b is disposed, i.e., in a transmissive display region. For example, the distance between the electrode for transmissive display 3b and the counter electrode 6 is 4.5 µm and the distance between the electrode for transmissive display 3a and the counter electrode 6 is 3.0 µm.

The surface of the array substrate 2 in contact with the liquid crystal layer 4 and the surface of the counter substrate 5 in contact with the liquid crystal layer 4 are covered with alignment films 7 and 8, respectively. The alignment film 8 is provided with a uniform treatment so that liquid crystal molecules in contact with the surface of the alignment film 8 are aligned in the same direction. Meanwhile, for the alignment film 7, an alignment film 7a for the reflective display region and an alignment film 7b for the transmissive display region are provided with each different treatment. The alignment film 7a on the electrode for reflective display 3a is treated so that the alignment direction of liquid crystal molecules in contact with the alignment film 7a makes an angle of 60 degrees with the alignment direction of liquid crystal molecules on the side of the counter substrate 4, and the alignment film 7b on the electrode for transmissive display 3b is treated so that the alignment direction of liquid crystal molecules in contact with the alignment film 7b makes an angle of 90 degrees with the alignment direction of liquid crystal molecules on the side of the counter substrate 5. Thus, as is shown in FIG. 1, liquid crystal molecules 4a in the region above the electrode for reflective display 3a and liquid crystal molecules 4b in the region above the electrode for transmissive electrode 3b are aligned in the same direction in a plane parallel to the principal surface of the counter substrate 5. In other words, the relation between $dr_a$ and $pr_a$ and $dr_b$ and $pr_b$ is expressed by the following equation:

$$dr_a/pr_a = dr_b/pr_b$$

where dr$_a$ is the distance of the liquid crystal molecule 4a from the surface of the counter substrate 5 where the molecule makes contact, pr$_a$ is the twist angle of the liquid crystal molecule 4a, dr$_b$ is the distance of the liquid crystal molecule 4b from the surface of the counter substrate 5 where the molecule makes contact, and pr$_b$ is the twist angle of the liquid crystal molecule 4b.

The liquid crystal display device of the present example can be fabricated, for example, in the following manner.

Figure 2:
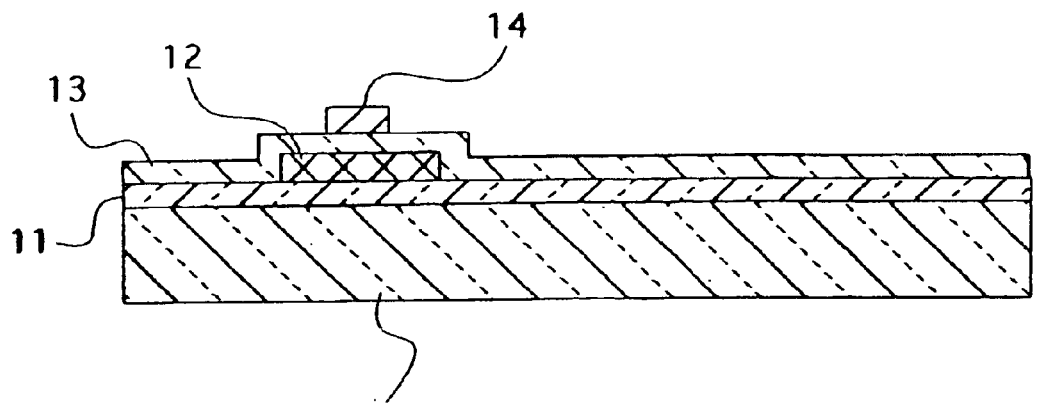
FIGS. 2(a) to 2(c) are schematic longitudinal sections showing the state of the main part of an array substrate at each step of the fabrication process of the liquid crystal display device.
Figure 2:
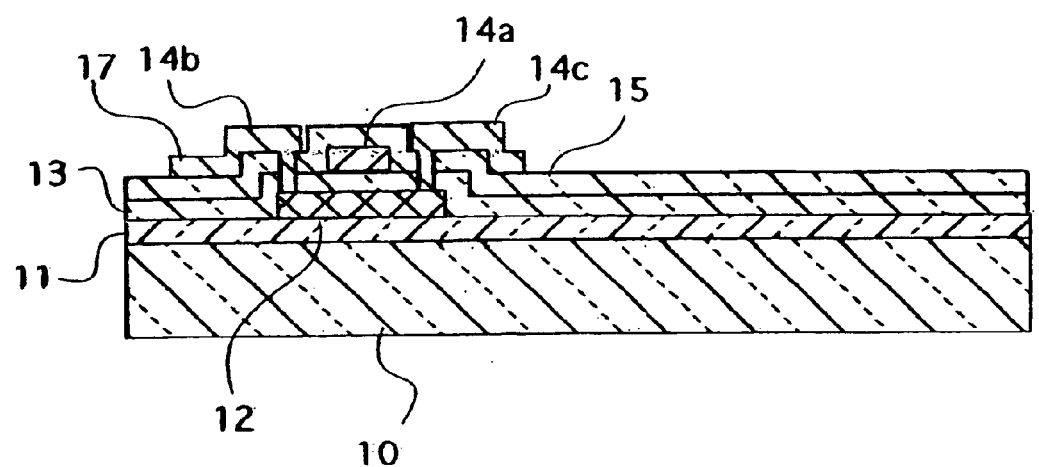
Figure 2:
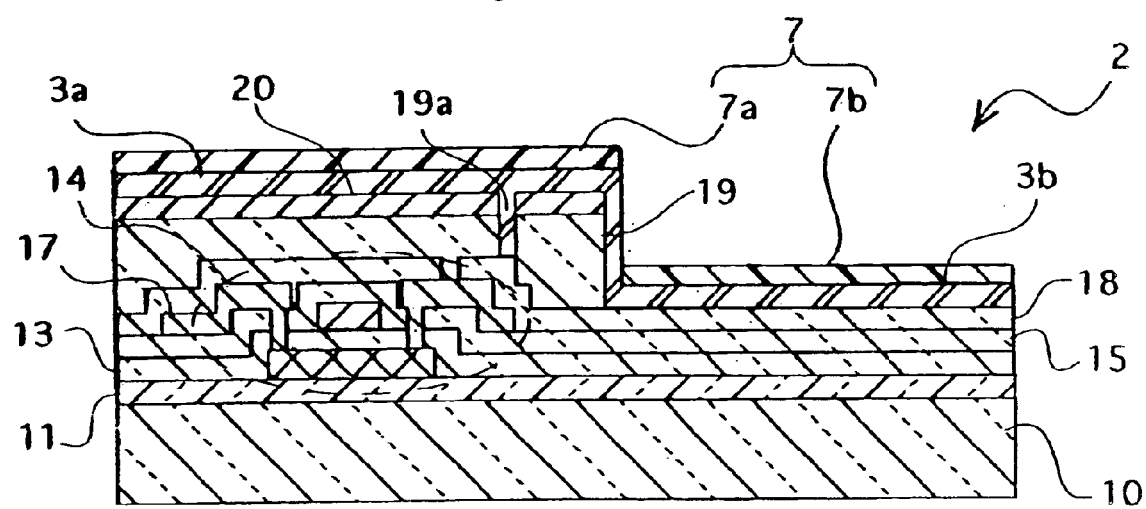

As shown in FIG. 2a, on a transparent glass substrate 10, a passivation film 11 composed of silicon oxide is formed and further an island shaped semiconductor film 12 composed of silicon is formed. Subsequently, on the surface of the substrate 10 having formed thereon the semiconductor film 12, an insulating film (gate insulating film) 13 composed of silicon oxide to cover the surface and a conductive film composed of aluminum are formed. The conductive film thus formed is then processed and formed into a gate electrode 14a for a thin film transistor 14 and a gate wiring line (not shown in the figure) integrated with the gate electrode 14a.

By performing a doping using the thus formed gate electrode 14a as a mask, impurities are implanted into predetermined regions of the semiconductor film 12, thus forming a source region, a dram region, and a channel region in the semiconductor film 12, and thereafter as is shown in FIG. 2b, an insulating film (interlayer insulating film) 15 is formed, covering the insulating film 13 and the gate electrode 14a. In the thus formed insulating films 13 and 15 of the source region and the drain region, contact holes 16a and 16b are formed, and a conductive film composed of aluminum is then formed, covering the contact holes. The conductive film is processed and formed into a source electrode 14b and a drain electrode 14c for the thin film transistor 14 and a source wiring line 17 integrated with the source electrode 14b.

On the surface of the substrate 10, an insulating film 18 is formed so as to cover the source electrode 14b, the drain electrode 14c, and the source wiring line 17, and further a planarizing film 19 composed of silicon nitride is formed so as to cover the insulating film 18. Subsequently, a reflective layer 20 composed of aluminum is formed in a predetermined region, covering part of the planarizing film 19 and then a contact hole 19a is formed in the planarizing film 19 and the reflective layer 20 immediately above the drain electrode.

A conductive film composed of a transparent conductive material such as ITO is formed and further this conductive film is processed, thereby obtaining a pixel electrode 3 including an electrode for reflective display 3a and an electrode for transmissive display 3b. Specifically, the electrode for reflective display 3a is formed in a region above the reflective layer 20 and the electrode for transmissive display 3b is formed in a region where neither the planarizing film 19 nor the reflective layer 20 are disposed.

On the surface of the substrate 10 having thereon the pixel electrode 3 being exposed, a passivation film (not shown in the figure) is formed, if necessary, and thereafter a UV curing polyimide material is coated. Thereby, a film that exhibits specified alignment characteristics is formed. By using the electrode for reflective display 3a as a mask and irradiating ultraviolet light from the other side of the substrate 10, an alignment film 7, as shown in FIG. 2c, is obtained which includes two regions 7a and 7b whose alignment directions differ from one another. That is to say, while in a region where the ultraviolet light has not reached because of the presence of the electrode for reflective display 3a and the like, the initial state is maintained, in a region exposed to the ultraviolet light, such as a region where the electrode for transmissive display 3b is formed, the alignment direction of the liquid crystals changes depending on the direction of ultraviolet light irradiation.

As was described above, by using the electrode for reflective display 3a as a mask, the two regions 7a and 7b can be formed in a self-aligned manner.

Meanwhile, as for a counter substrate 5, a uniform alignment treatment is provided by irradiating the entire surface thereof with ultraviolet light from one direction. The pretilt angle of the liquid crystal molecules is set to, for example, 5°.

The array substrate 3 and the counter substrate 5 thus obtained are stacked together and further a liquid crystal material is injected between the two substrates to form a liquid crystal layer 4.

On the outer surfaces of the display panel thus obtained, retardation films 21 and 22 are disposed so as to prevent variations in hue resulting from the birefringence of the liquid crystal material and to compensate residual retardation according to viewing angle directions, the residual retardation being caused by liquid crystal molecules at the boundaries with the substrates which do not stand up completely during a black display with a voltage being applied. For the retardation films 21 and 22, it is possible to use a retardation film of a discotic liquid crystal with hybrid alignment or a biaxial retardation film having retardation in a plane and satisfying the following relationship:

$$nx > ny > nz$$

where nz is the refractive index in a direction normal to the film surface and nx and ny are the refractive indices in two directions orthogonal to each other and parallel to the film surface.

In order to more effectively increase the viewing angle of the panel or enhance the contrast of the panel by optical compensation, it is more preferable to use a retardation film of which characteristics differ between the reflective display region and the transmissive display region. Such a retardation film can be obtained by curing a UV crosslinking liquid crystal polymer under conditions that vary region to region.

Next, polarizing plates 23 and 24 are stacked, and in order that both of the reflective display region and the transmissive display region have a normally white mode, the retardation levels of the retardation films 21 and 22, the axis directions of the refractive indices of the retardation films 21 and 22, and the axis directions of the polarizing plates 23 and 24 were adjusted.

It should be noted that adding a chiral material to the liquid crystal layer imparts a spontaneous twist to the alignment of liquid crystal molecules. When an alignment treatment is provided only to an alignment film on one of the substrates, the alignment of the liquid crystal material is determined by its chiral pitch, and therefore when an alignment film is formed on each of the array substrate and the counter substrate and then an alignment treatment is provided only to the alignment film on the counter substrate having a flatter surface, continuity of the alignment of the liquid crystal molecules can be maintained even if the array substrate in contact with the liquid crystal layer has irregularities on the surface thereof.

In the above-described transflective liquid crystal display device, the liquid crystal layer has a twisted nematic alignment, but even with other types of alignment, for example, a vertical or homogeneous alignment, continuity of the alignment of liquid crystal molecules can be maintained between the reflective display region and the transmissive display region.

By arranging a backlight portion and a driving portion to and further providing an external signal input portion to the above-described transflective liquid crystal display panel, a personal digital assistant device can be obtained. In addition, by arranging an external signal receiving portion, a liquid crystal television can be obtained.

EXAMPLE 2

The present example shows an example of a transflective liquid crystal display device of an OCB (optically compensated bend) mode.

The OCB mode liquid crystal display device has many advantages such as a fast response time and wide viewing angle.

Figure 3:
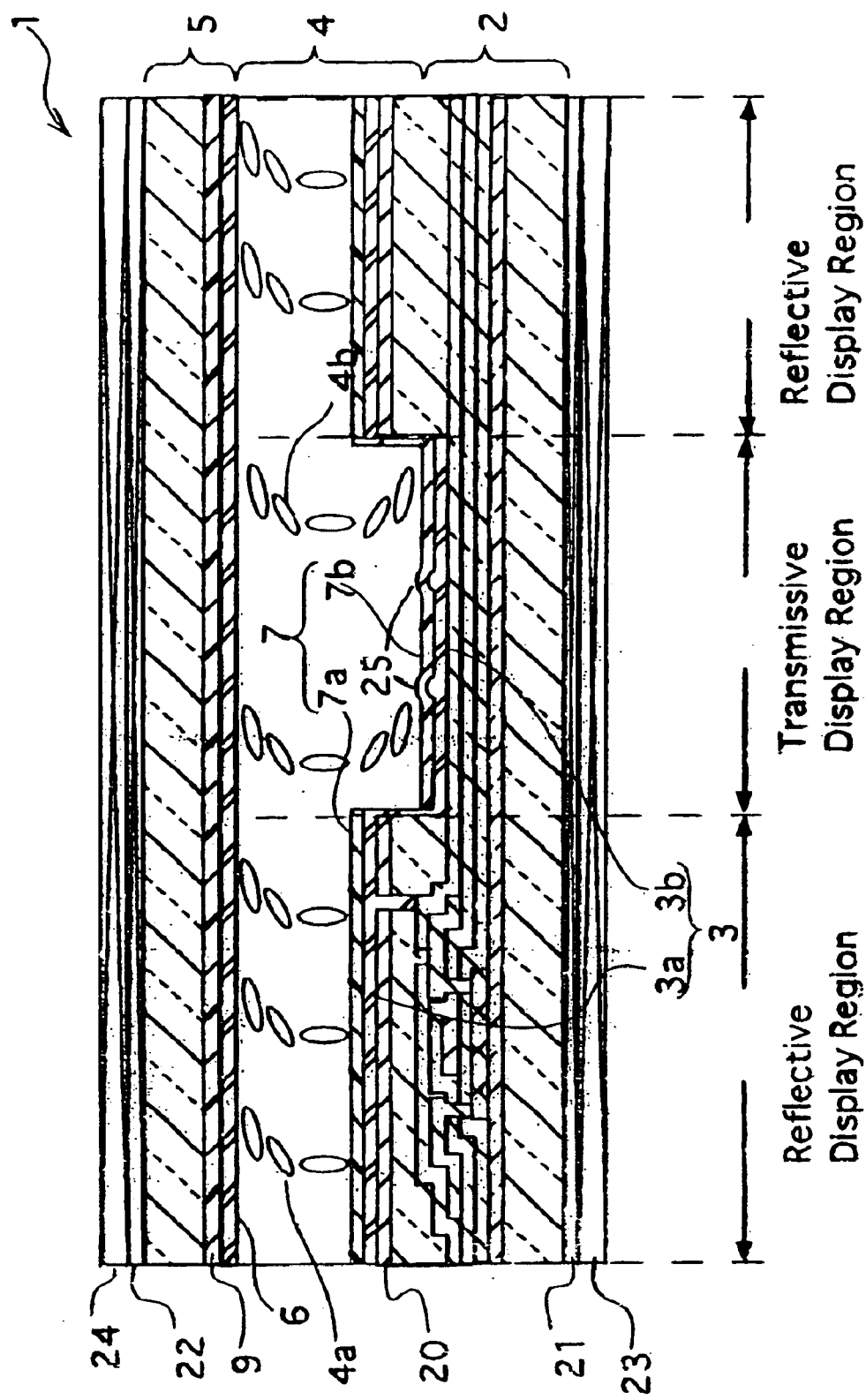
FIG. 3 is a schematic longitudinal section showing the main part of a transflective liquid crystal display device of another example of the present invention.

A transflective liquid crystal display device of the present example is shown in FIG. 3.

In a liquid crystal layer 4 immediately above an electrode for transmissive display 3b, liquid crystal molecules are driven in the OCB mode. On a surface of the electrode for transmissive display 3b, protrusions 25 serving as an alignment transition means are formed to promote the transition of the liquid crystal molecules from a splay alignment to a bend alignment upon application of voltage.

In this transflective liquid crystal display panel, when liquid crystal molecules in a transmissive display region have a bend alignment, liquid crystal molecules 4a in a reflective display region are controlled so as to have a hybrid alignment, as shown in FIG. 3, in which the long axes of the liquid crystal molecules 4a are oriented perpendicular to the surface of an electrode for reflective display 3a. Thereby, the liquid crystal molecules 4a in a region above the electrode for reflective display 3a and liquid crystal molecules 4b in a region above the electrode for transmissive display 3b are aligned in substantially the same direction in a plane parallel to the principal surface of a counter substrate 5.

This transflective liquid crystal display panel can be obtained in a similar manner to that described in Example 1. It should be noted that for an alignment film 7 such a film is used that causes the liquid crystal molecules to align in a direction perpendicular to the film when the film is formed and changes the molecular direction to horizontal by ultraviolet light irradiation. When ultraviolet light is irradiated from the rear face of an array substrate 3, i.e., a surface on the other side of the surface having formed thereon the alignment film 7, the electrode for reflective display 3a functions as a mask and thus the ultraviolet light does not reach the alignment film in a region where the electrode for reflective display 3a is formed. On the other hand, in a region where the electrode for transmissive display 3b is formed, the ultraviolet light is transmitted through the electrode for transmissive display 3b and irradiated to the alignment film. Consequently, an alignment film 7a in the reflective display region causes the liquid crystal molecules to align perpendicular to the alignment film 7a, and an alignment film 7b in the transmissive display region causes the liquid crystal molecules to align parallel to the alignment film 7b. For example, the pretilt angle of the liquid crystal molecules above the alignment film 7a is set to 88° and the pretilt angle of the liquid crystal molecules above the alignment film 7b to 5°.

Meanwhile, an alignment film 8 on the side of the counter substrate 5 causes the liquid crystal molecules to align substantially parallel to the alignment film 8. For example, the pretilt angle of the liquid crystal molecules above the alignment film 8 is set to 5°.

The above-described alignment treatment allows, after the two substrates have been bonded together, the liquid crystal molecules in the transmissive display region and the liquid crystal molecules in the reflective display region to have a splay alignment and a hybrid alignment, respectively. Hence, when the panel is driven, the transmissive display region turns to the OCB mode and the reflective display region to the R—OCB mode.

Preferably, the thickness of the liquid crystal layer 4 in the reflective display region is substantially half of that of the liquid crystal layer 4 in the transmissive display region, whereby continuity of the alignment of the liquid crystal molecules is maintained at the boundary between the two regions, reducing alignment defects. This can be explained by the fact that in the OCB mode, the alignment of the liquid crystal molecules transmits to a bend alignment upon driving and thus the liquid crystal molecules at the central portion of the liquid crystal layer in the transmissive display region are aligned substantially perpendicular to the alignment film.

EXAMPLE 3

The present example shows an example of a transflective liquid crystal display panel capable of providing a display with higher color saturation both in a reflective display mode and in a transmissive display mode.

Figure 4:
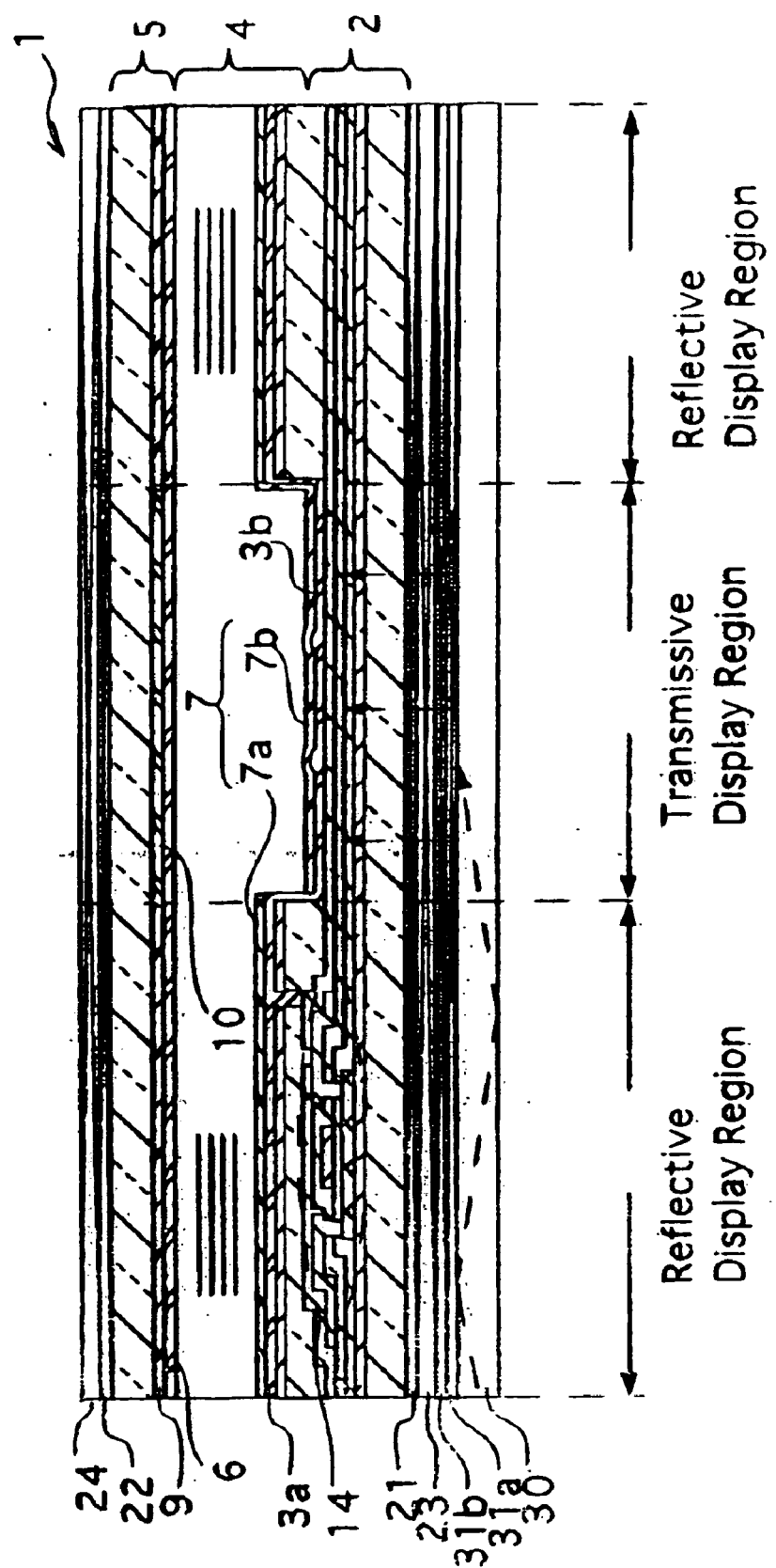
FIG. 4 is a schematic longitudinal section showing the main part of a transflective liquid crystal display device of another example of the present invention.

The configuration of a transflective liquid crystal display device of the present example is shown in FIG. 4.

A color filter layer 9 of red (R), green (G), and blue (B) is disposed in a region on a counter substrate 5 facing an electrode for reflective display 3a. In a region facing an electrode for transmissive display 3b, a non-color layer 10 is disposed, and the color filter layer 9 is disposed only in the region facing the electrode for reflective display 3a.

In the reflective display mode, light entered from the outside is transmitted through the color filter layer 9 and a liquid crystal layer 4, and then reflected at the electrode for reflective display 3a, and again transmitted through the liquid crystal layer 4 and the color filter layer 9, thus emitting out. In other words, with this mode, the panel is driven in the same manner as prior art reflective liquid crystal display panels.

On the other hand, in the transmissive display mode, red, green, and blue lights are emitted, as indicated by the arrows in the figure, from a light source (not shown in the figure) on a time division basis. The light source is, for example, a light-emitting diode (LED) that emits light having bright-line spectra whose peaks are at wavelengths of 440 nm (blue light), 540 nm (green light), and 620 nm (red light), each peak having a half-width of 30 nm, and driven on a time division basis such that these three colors of lights are switched every 8 ms. Light emitted from the light source propagates through a light guiding plate 30, passes through optical films 31a and 31b, and then reaches an array substrate 2. The optical films 31a and 31b are intended to collect light from the light source onto the side of the array substrate 2. That is to say, light which is colored in advance is transmitted through the electrode for transmissive display 3b and the liquid crystal layer 4 and then emitted out without passing through the filter. Specifically, in the present example, the transmissive display mode does not utilize color filters and a color display is provided independently by the reflective display mode and the transmissive display mode. Therefore, color mixing can be prevented in the reflective display mode.

When normally black is set so that the reflective display regions are always black in the transmissive display mode, color mixing does not occur.

It is also possible to provide a gap in the transmissive display regions. It should be noted, however, that by disposing a non-color layer, a surface of the counter substrate can be made even flatter. Thus, when adjusting the alignment of liquid crystal molecules as in the above example, by disposing a non-color layer, it is not necessary to provide a plurality of regions on an alignment film on the counter substrate side, but just to form on the counter substrate an alignment film provided with a uniform treatment.

When the ratio of the size of the reflective display region to the size of the transmissive display region is set to 0.1–0.6, it is possible to display high brightness images both in the reflective display mode and in the transmissive display mode.

Figure 5:
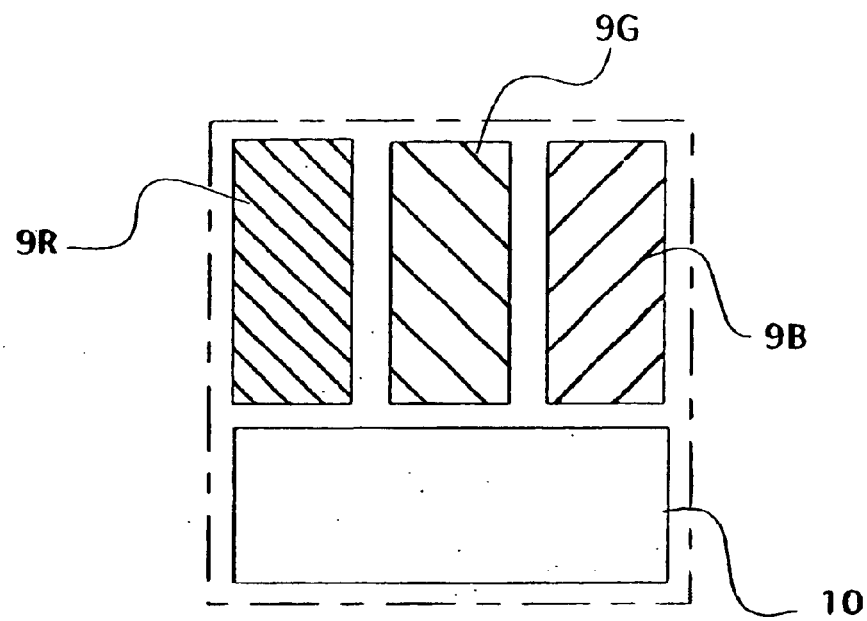
FIGS. 5(a) and 5(b) are schematic plan views each showing a layout of the main part of a color filter layer and a non-color layer of a transflective liquid crystal display device of still another example of the present invention.
Figure 5:
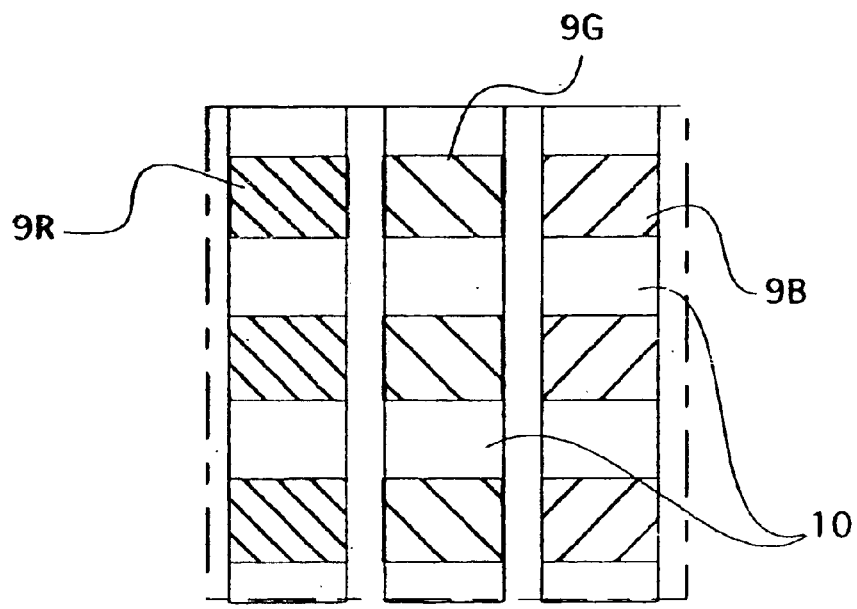

A non-color layer or a gap for transmissive display can be provided on the color filter layer 9 of each color, as was the case with the above-described liquid crystal display panel, or can also be provided, for example, in such a manner that is shown in FIGS. 5a and 5b. Specifically, the non-color layer or gap can be provided separately from color filter layers 9R, 9G, and 9B or can be provided between each color filter layer 9R, 9G, and 9B formed in a stripe pattern.

Figure 6:
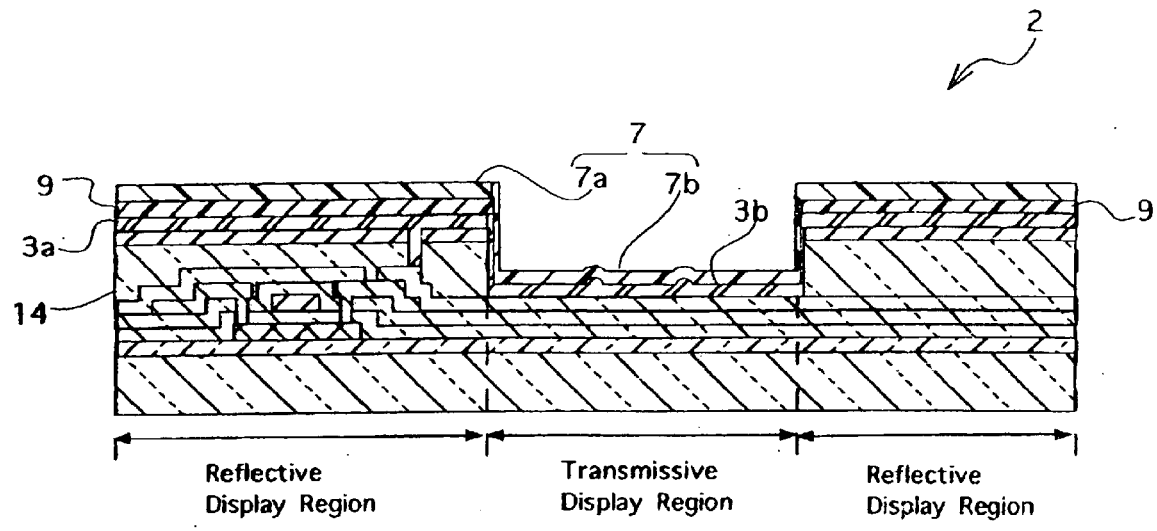
FIG. 6 is a schematic longitudinal section showing the main part of an array substrate utilized in a transflective liquid crystal display device of another example of the present invention.

Furthermore, when a color filter layer 9 is provided on the side of an array substrate 3 as is shown in FIG. 6, precision bonding of the two substrates is improved, enabling stable fabrication of the panel with high aperture ratio. Consequently, a display panel capable of providing a display with higher brightness can be obtained.

EXAMPLE 4

The present example shows an example of a transflective liquid crystal display panel capable of providing a display with high color purity both in a reflective display mode and in a transmissive display mode.

Figure 7:
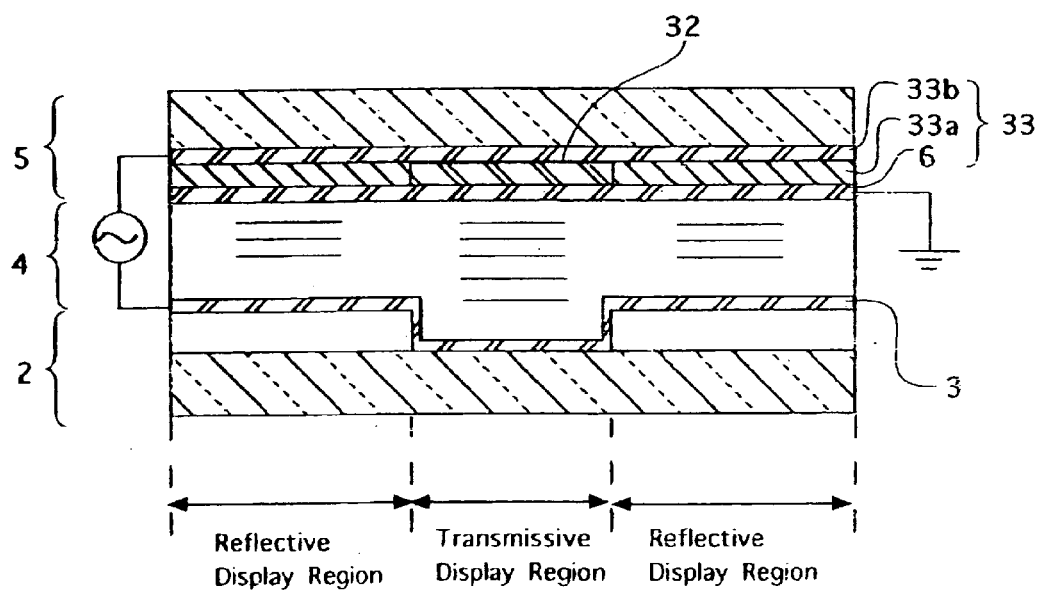
FIG. 7 is a schematic longitudinal section showing the main part of a transflective liquid crystal display device of another example of the present invention.

The configuration of a transflective liquid crystal display device of the present example is shown in FIG. 7.

Liquid crystal molecules of a liquid crystal layer 4 are driven in the OCB and R—OCB modes as was the case with Example 2.

In a reflective display region of a counter substrate 5, a color-variable color filter layer 33 is disposed, and in a transmissive display region, a non-color layer 32 is disposed. The color filter layer 33 can arbitrarily select transmitted light by means of an external input.

The color filter layer 33 is formed of, for example, a cholesteric liquid crystal. Cholesteric liquid crystals selectively reflect specified wavelength components of light entered in the axis direction of the liquid crystals. A wavelength to be selectively reflected is determined by the pitch of the liquid crystals. In addition, the pitch is changed by applying a voltage to the liquid crystals.

By mixing together a cholesteric liquid crystal with a pitch of approximately 400 nm and a liquid crystalline polymer and polymerizing the mixture by UV light so that the liquid crystalline polymer forms a network structure, a color filter that selectively reflects blue can be obtained. Here, transmitted light is yellow which is the complementary color of blue. That is, a color filter layer that transmits yellow light can be obtained. When a voltage is applied to the cholesteric liquid crystal, the chiral pitch of the liquid crystal increases and the selectively-reflected wavelength changes from blue (B) to green (G) to red (R) in this order.

Thus, by application of a voltage, a CMY color filter can be obtained, capable of arbitrarily selecting light to be transmitted therethrough, from yellow (Y), magenta (M), and cyan (C). In addition, by stacking two color filters of the same kind, an RGB color filter can be obtained.

That is, the cholesteric liquid crystal can be utilized as a reflecting means and a coloring means.

The color filter layer 33 includes a cholesteric layer 33a and electrodes for applying a voltage to the cholesteric layer 33a. Of these electrodes, an electrode on the side in contact with the liquid crystal layer 4 is composed of a transparent conductive material such as ITO and also serves as a counter electrode 6 for applying a voltage to the liquid crystal layer. The other electrode, an electrode 33b, applies a voltage so that the cholesteric layer selectively reflects red, green, or blue light. It should be noted that by grounding the counter electrode 6 and applying a voltage between the electrodes 6 and 33b, as is shown in FIG. 7, it is possible to drive the filter with a drive circuit which outputs source signals and the like, without the need to provide an additional drive circuit to drive the filter.

A voltage for changing the colors of the color filter layer 33 can also be applied between the counter substrate 5 and an array substrate 3.

Light transmitted through the color filter which contributes to a reflective display can be arbitrarily selected, and therefore by, even in the transmissive display mode, changing the colors of the color filter layer in accordance with the colors displayed in the transmissive display regions, it is possible to prevent reduction in color purity caused by light entered from the outside. Therefore, according to the present example, a colorful display with high color purity can be realized both in the reflective display mode and in the transmissive display mode.

When the selectively-transmitted wavelengths of the color filter layer 33 and the peaks of the bright-line spectra of the light source are made to substantially correspond to one another, the color purity of pixels can be made substantially the same level between the reflective display mode and the transmissive display mode. When, as was the case with Example 4, an LED, serving as the light source (not shown in the figure), was used which emits light having bright-line spectra whose peaks are at wavelengths of 440 nm (blue light), 540 nm (green light), and 620 nm (red light), each peak having a half-width of 30 nm, and the selectively-transmitted wavelengths of the color filter layer 33 were 450 nm (blue light), 530 nm (green light), and 610 nm (red light), the half width of the transmitted light was 70 nm.

It should be noted that it is also possible to dispose the above described color-variable color filter on the array substrate side. For example, as is shown in FIG. 8, an electrode for reflective display 3a is utilized as the electrode for applying a voltage to a cholesteric layer 33a, and further a light-absorbing layer 34 is disposed underneath the other electrode so that light transmitted through the cholesteric layer 33a is not reflected.

Because specified wavelength components are reflected at the color filter surface, even if the cholesteric layer is a single layer, it is possible to display three colors of R, G, and B.

Figure 8:
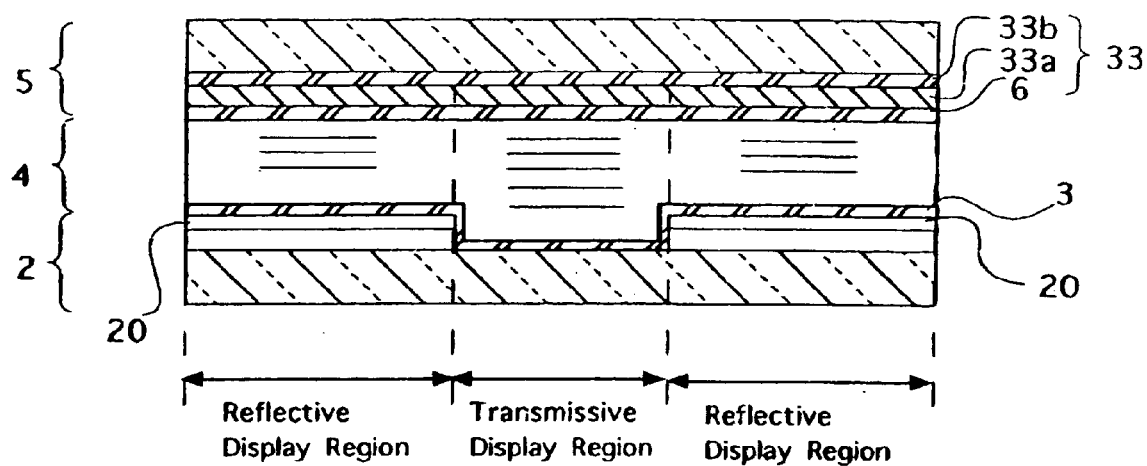
FIG. 8 is a schematic longitudinal section showing the main part of a transflective liquid crystal display device of another example of the present invention.
Figure 9:
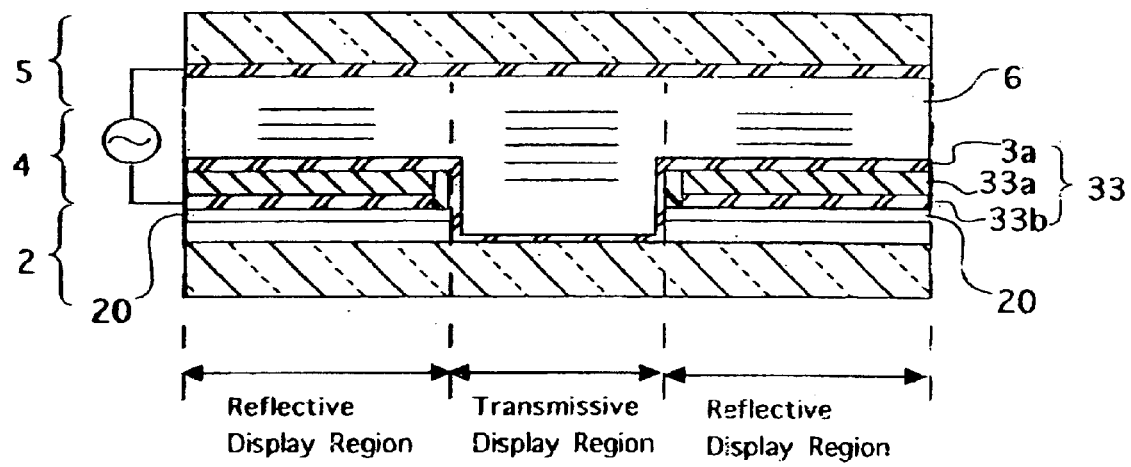
FIG. 9 is a schematic longitudinal section showing the main part of a transflective liquid crystal display device of yet another example of the present invention.

The color-variable color filter can display an arbitrary color and thus is not required to be disposed on each pixel; for example, as is shown in FIG. 8, the color variable color filter can be formed uniformly over all the display regions of the panel.

It should be noted that when the display colors of pixels are cyan, magenta, and yellow, twice the brightness of the case of displaying R, G, and B can be obtained

EXAMPLE 5

In a transflective liquid crystal display panel of the present example, a color filter layer is disposed both in reflective display regions and in transmissive display regions.

Figure 10:
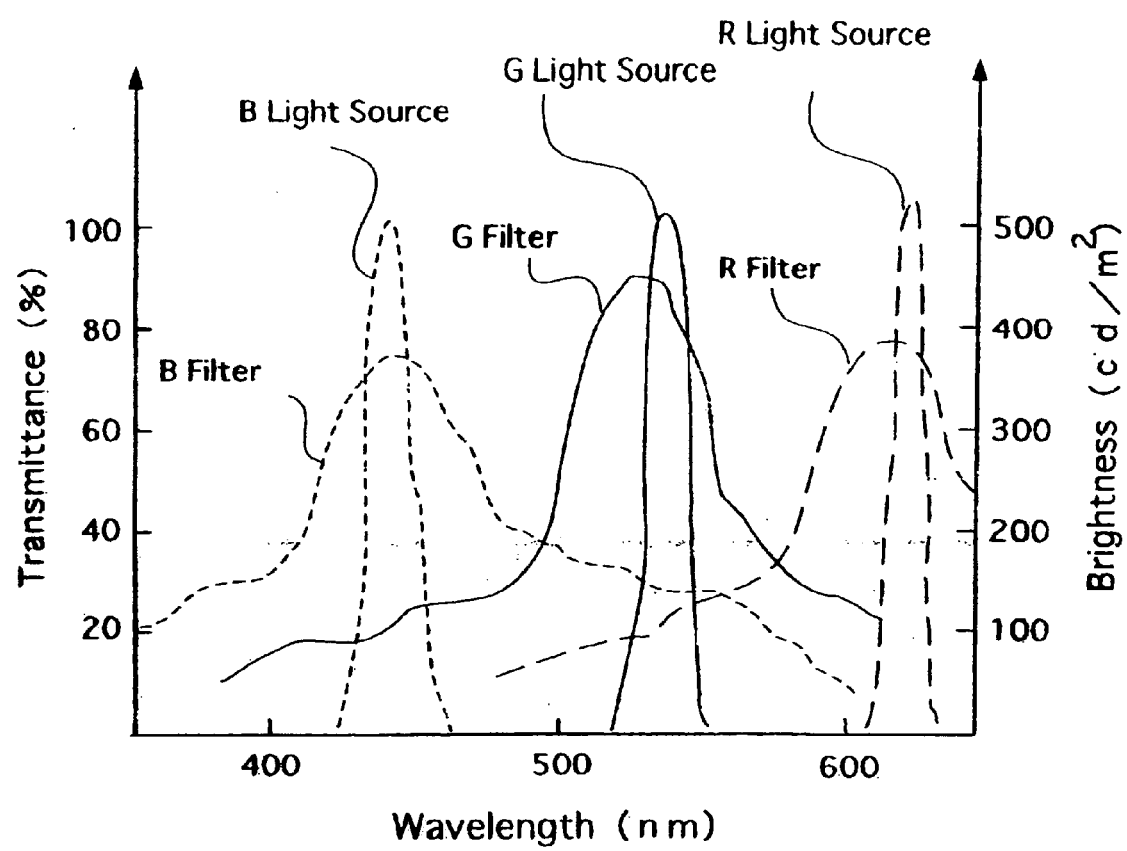
FIG. 10 is a plot of characteristic curves showing the wavelength spectrum of a light source utilized in a transflective liquid crystal display device of another example of the present invention and the light transmission characteristics of a color filter layer utilized in the same device.

In reflective liquid crystal display devices, generally, in order to ensure brightness, a color filter with a transmittance of as high as about 70% is utilized. Thus, as is shown in FIG. 10, colors with low purity but not monochromatic colors of R, G, and B are displayed. Accordingly, in the transmissive display mode too, by allowing these monochromatic lights irradiated on a time division basis by a field-sequential technique to be transmitted through such a color filter layer having a high transmittance, a display with higher purity can be realized than that obtained by a conventional liquid crystal display device utilizing a backlight which projects white light. In addition, because of the high transmittance of the color filter layer, part of the monochromatic lights is transmitted through the color filters of other colors. Thus, a high brightness display is made possible.

EXAMPLE 6

Even when utilizing, as the backlight, a white light source that emits light having such peak wavelengths that substantially correspond to each transmission peak wavelength of a color filter layer, a display with higher brightness can be realized than in the case of utilizing a conventional backlight that emits light including intermediate colors. By allowing both transmissive display regions and reflective display regions to have a normally black mode, when the transmissive display regions display black in a transmissive display mode, the reflective display regions also display black. Therefore, even if outside light enters, so-called black floating does not occur, and thus the contrast is not reduced.

EXAMPLE 7

The present example shows an example that allows light propagated through a light guiding plate to be effectively used for transmissive display.

Figure 11:
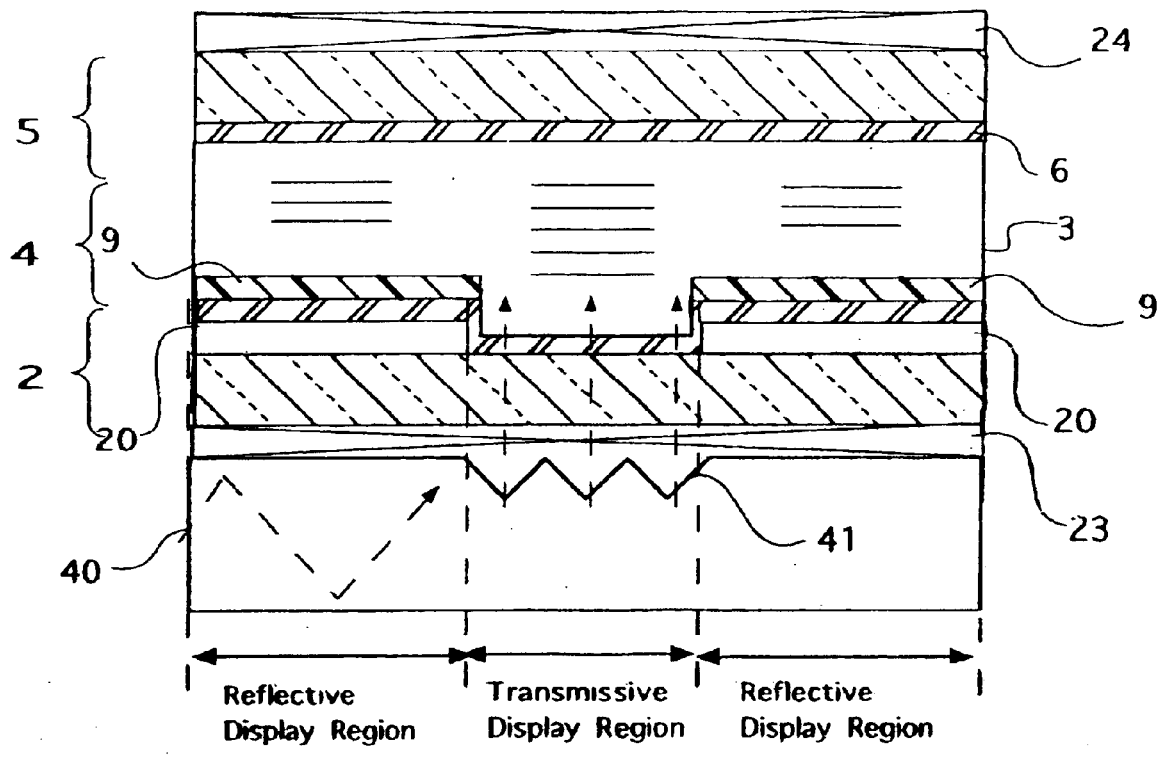
FIG. 11 is a schematic longitudinal section showing the main part of a transflective liquid crystal display device of another example of the present invention.

A transflective liquid crystal display device of the present example is shown in FIG. 11. In the liquid crystal display device, a light guiding plate 40 propagates light from a light source (not shown in the figure) and emits the light towards a transmissive display region in each pixel. The light guiding plate 40 has a plurality of V-shaped slots 41 formed at a position corresponding to the transmissive display region. Light emitted from the light source repeats total reflection at a flat surface of the light guiding plate 30 and when the light reaches the V-shaped slots 41, the light is emitted towards a liquid crystal layer. It should be noted that a polarizing plate 23 may be disposed on a surface where a pixel electrode 3 is formed. In addition, by providing slots similar to those described above on a substrate, which is a component of an array substrate, it is also possible to make the substrate function as the above-described light guiding plate. When the substrate is made of a synthetic resin, the processing is easier.

EXAMPLE 8

The present example shows an example of a transflective liquid crystal display device that provides an easier assembly process.

Figure 12:
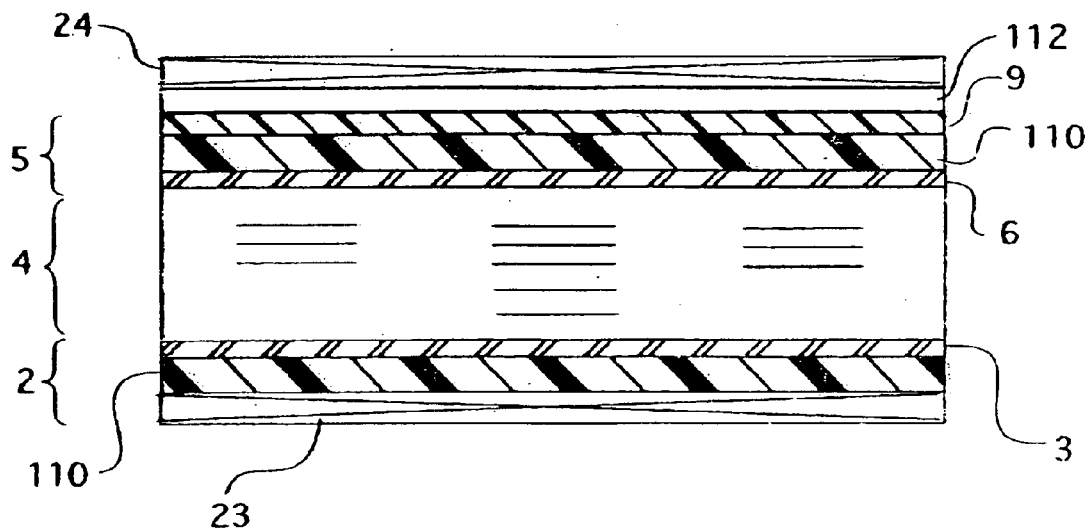
FIG. 12 is a schematic longitudinal section showing the main part of a transflective liquid crystal display device of another example of the present invention.
Figure 13:
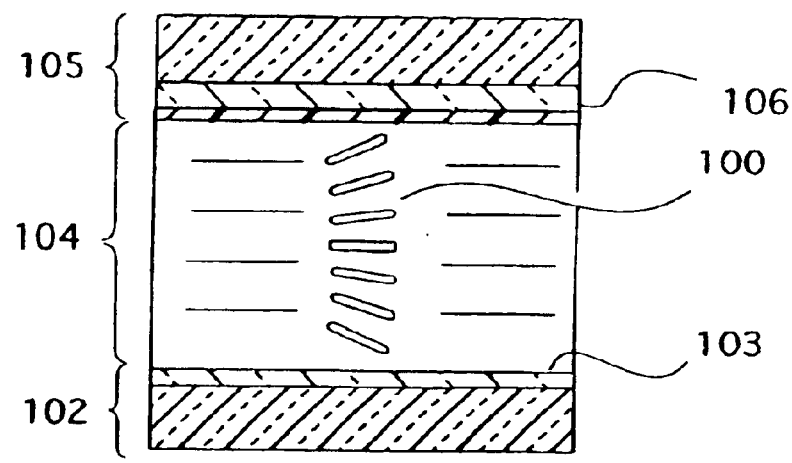
FIGS. 13(a) and 13(b) are models showing alignments of liquid crystal molecules in an OCB mode.
Figure 13:
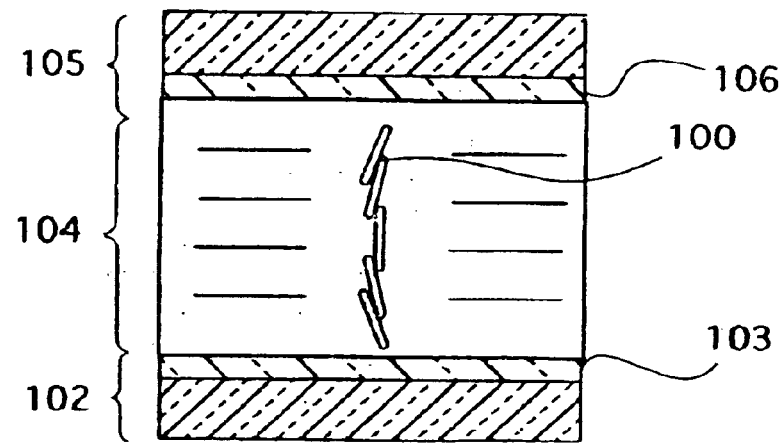
Figure 14:
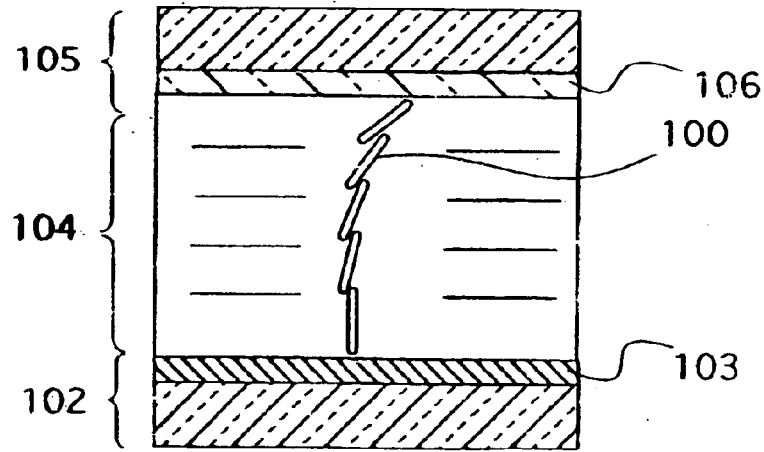
FIG. 14 is a model showing an alignment of liquid crystal molecules in an R—OCB mode.

A transflective liquid crystal display device of the present example is shown in FIG. 12. In this liquid crystal display device, as an array substrate 2 and a counter substrate 5 which sandwich a liquid crystal layer 4 therebetween, substrates 110 each made of a synthetic resin are utilized. The thickness of the substrates 110 is, for example, 0.1 mm. On the substrates 110, transflective electrodes, for example, made of aluminum with a thickness of 200 nm are formed. On a surface of the counter substrate 5 on the light emitting side, a diffusion layer 112 is disposed for increasing the viewing angle. A color filter layer 9 for coloring transmitted light or reflected light is disposed on the surface of the counter substrate 5 opposite that facing the liquid crystal layer. When the substrates are made of a resin, the thickness can be made thinner than that of the substrates made of glass, and thus even if the color filter layer is disposed on the outer surface of the panel, parallax does not occur and an excellent display can be realized. In addition, the color filter layer may be disposed on the other substrate, i.e., on the array substrate side. In the case of forming protrusions on the transflective electrode for scattering light, the protrusions can be provided such that the electrode is split into a transmissive display portion and a reflective display portion, as are the cases in the foregoing other examples. Further, when the protrusions are disposed, it is not necessary to provide the diffusion layer 112.

INDUSTRIAL APPLICABILITY

According to the present invention, it is possible to provide a liquid crystal display device with excellent display quality and excellent response time that is capable of providing a high brightness display both in the transmissive display mode and in the reflective display mode and of precisely controlling the alignment of liquid crystal molecules.

What is claimed is:

1. A transflective liquid crystal display device comprising:
   a pair of substrates;
   a liquid crystal layer sandwiched between the substrates;
   pixel electrodes located on a surface of one of the substrates facing the liquid crystal layer, each of the pixel electrodes comprising an electrode for reflective display and an electrode for transmissive display;
   a counter electrode located on a surface of the other substrate facing the liquid crystal layer; and
   an alignment film covering the surface of each of the substrates facing the liquid crystal layer,
   wherein a distance from the electrode for transmissive display to the other substrate is different from a distance from the electrode for reflective display to the other substrate;
   wherein liquid crystal molecules at a surface of the electrode for reflective display are aligned in a same direction as liquid crystal molecules above the electrode for transmissive display that are in a same plane as the liquid crystal molecules above the electrode for reflective display, the plane being parallel to principal surfaces of the substrates; and
   wherein a relation between $dr_a$ and $pr_a$ and $dr_b$ and $pr_b$ is expressed by the following equation:

$$dr_a/pr_a = dr_b/pr_b$$

wherein $dr_a$ is the distance of the liquid crystal molecules above the electrode for reflective display from the surface of the substrate where the molecules make contact and the pixel electrodes are not located, $pr_a$ is the twist angle of the liquid crystal molecules, $dr_b$ is the distance of the liquid crystal molecules above the electrode for transmissive display from the surface of the substrate where the molecules make contact and the pixel electrodes are not located and $pr_b$ is the twist angle of the liquid crystal molecules.

2. The transflective liquid crystal display device according to claim 1, wherein the alignment films are for aligning principal axes of liquid crystal molecules in contact with the alignment films to be parallel to surfaces of the alignment films, the liquid crystal molecules being of the liquid crystal layer.

3. The transflective liquid crystal display device according to claim 2, wherein liquid crystal molecules in a region corresponding to the portion of the pixel electrode at a longer distance from the other substrate are driven in an optically compensated bend mode such that alignment changes between a splay alignment and a bend alignment, and wherein liquid crystal molecules in a region corresponding to the other portion of the pixel electrode are driven in a reflective type optically compensated bend mode exhibiting a hybrid alignment.

4. The transflective liquid crystal display device according to claim 3, wherein the alignment film in a region above the electrode for transmissive display and the alignment film in a region above the electrode for reflective display align liquid crystal molecules in contact with the alignment films to different pretilt angles.

5. The transflective liquid crystal display device according to claim 3, further comprising means for promoting transition of alignment of the liquid crystal molecules, the means for promoting transition located in a region corresponding to the electrode for transmissive display.

6. The transflective liquid crystal display device according to claim 1, wherein the alignment film on the substrate on which the pixel electrodes are not located is for aligning a liquid crystal material in contact therewith is the same in a region corresponding to the electrode for transmissive display and a region corresponding to the electrode for reflective display, the liquid crystal material being of the liquid crystal layer.

7. The transflective liquid crystal display device according to claim 6, wherein the liquid crystal layer comprises a chiral material.

8. The transflective liquid crystal display device according to claim 6, wherein the alignment film on the substrate having the pixel electrodes located thereon is for alignment of the liquid crystal material in contact therewith and is different in the region corresponding to the electrode for transmissive display and the region corresponding to the electrode for reflective display, the liquid crystal material being of the liquid crystal layer.

9. The transflective liquid crystal display device according to claim 1, wherein a thickness of a liquid crystal layer above the electrode for transmissive display is larger than a thickness of a liquid crystal layer above the electrode for reflective display.

10. The transflective liquid crystal display device according to claim 1, further comprising a retardation film located on each of a pair of the principal surfaces, the retardation films being for compensating residual retardation of liquid crystals at boundaries with the substrates upon application of voltage, according to viewing angle directions.

11. The transflective liquid crystal display device according to claim 10, wherein the retardation films each comprise a discotic liquid crystal having a disc-like shape and a hybrid alignment.

12. The transflective liquid crystal display device according to claim 10, wherein the retardation film satisfies a relationship nx>ny>nz, where nx is a maximum refractive index in a plane of the film, ny is a refractive index in a direction perpendicular to the plane of the nx, and nz is a refractive index in a direction perpendicular to a surface of the film.

13. A transflective liquid crystal display device comprising:

a pair of substrates;
a liquid crystal layer sandwiched between the substrates;
pixel electrodes located on a surface of one of the substrates facing the liquid crystal layer, each of the pixel electrodes including an electrode for reflective display and an electrode for transmissive display;
a counter electrode disposed on a surface of the other substrate facing the liquid crystal layer;
an alignment film covering the surface of each of the substrates facing the liquid crystal layer;
a color filter layer located so as to oppose to the electrode for reflective display; and
a light source for irradiating the liquid crystal layer with colored light on a time division basis through the electrode for transmissive display,
wherein a distance from the electrode for transmissive display to the other substrate is different from a distance from the electrode for reflective display to the other substrate;
wherein liquid crystal molecules at a surface of the electrode for reflective display are aligned in a same direction as liquid crystal molecules above the electrode for transmissive display that are in a same plane as the liquid crystal molecules above the electrode for reflective display, the plane being parallel to principal surfaces of the substrates; and
wherein a relation between $dr_a$ and $pr_a$ and $dr_b$ and $pr_b$ is expressed by the following equation:

$$dr_a/pr_a = dr_b/pr_b$$

where $dr_a$ is the distance of the liquid crystal molecules above the electrode for reflective display from the surface of the substrate where the molecules make contact and the pixel electrodes are not located, $pr_a$ is the twist angle of the liquid crystal molecules, $dr_b$ is the distance of the liquid crystal molecules above the electrode for transmissive display from the surface of the substrate where the molecules make contact and the pixel electrodes are not located, and $pr_b$ is the twist angle of the liquid crystal molecules.

14. The transflective liquid crystal display device according to claim 13, wherein the color filter layer is located in a region including a path of the colored light.

15. The transflective liquid crystal display device according to claim 13, wherein a wavelength of the colored light substantially corresponds to a wavelength at which transmittance of the color filter layer exhibits a peak.

16. The transflective liquid crystal display device according to claim 13, wherein the color filter layer is such that a wavelength of light to be transmitted through the color filter layer is changed by means of an external input.

17. A transflective liquid crystal display device comprising:

a pair of substrates;
a liquid crystal layer sandwiched between the substrates;
pixel electrodes located on a surface of one of the substrates facing the liquid crystal layer, each of the pixel electrodes comprising an electrode for reflective display and an electrode for transmissive display;
a counter electrode located on a surface of the other substrate facing the liquid crystal layer;
an alignment film covering the surface of each of the substrates facing the liquid crystal layer; and
a reflective layer for selectively reflecting light of a specified wavelength, the reflective layer being stacked on the electrode for reflective display, wherein a distance from the electrode for transmissive display to the other substrate is different from a distance from the electrode for reflective display to the other substrate;

wherein liquid crystal molecules at a surface of the electrode for reflective display are aligned in a same direction as liquid crystal molecules above the electrode for transmissive display that are in a same plane as the liquid crystal molecules above the electrode for reflective display, the plane being parallel to principal surfaces of the substrates; and wherein a relation between $dr_a$ and $pr_a$ and $dr_b$ and $dr_b$ is expressed by the following equation:

$$dr_a/pr_a = dr_b/pr_b$$

where $dr_a$ is the distance of the liquid crystal molecules above the electrode for reflective display from the surface of the substrate where the molecules make contact and the pixel electrodes are not located, $pr_a$ is the twist angle of the liquid crystal molecules, $dr_b$ is the distance of the liquid crystal molecules above the electrode for transmissive display from the surface of the substrate where the molecules make contact and the pixel electrodes are not located, and $dr_b$ is the twist angle of the liquid crystal molecules.

18. The transflective liquid crystal display device according to claim 17, further comprising a light source for irradiating the liquid crystal layer with colored light on a time division basis through the electrode for transmissive display.

19. A transflective liquid crystal display device comprising:
- a pair of substrates;
- a liquid crystal layer sandwiched between the substrates;
- pixel electrodes located on a surface of one of the substrates facing the liquid crystal layer, each of the pixel electrodes comprising an electrode for reflective display and an electrode for transmissive display;
- a counter electrode located on a surface of the other substrate facing the liquid crystal layer;
- an alignment film covering the surface of each of the substrates facing the liquid crystal layer;
- a color filter layer located so as to oppose to the pixel electrodes; and
- a light source for irradiating the liquid crystal layer with white light through the electrode for transmissive display, the white light having a spectrum of a specified peak wavelength, wherein a distance from the electrode for transmissive display to the other substrate is different from a distance from the electrode for reflective display to the other substrate;

wherein liquid crystal molecules at a surface of the electrode for reflective display are aligned in a same direction as liquid crystal molecules above the electrode for transmissive display that are in a same plane as the liquid crystal molecules above the electrode for reflective display, the plane being parallel to principal surfaces of the substrates; and wherein a relation between $dr_a$ and $pr_a$ and $dr_b$ and $pr_b$ is expressed by the following equation:

$$dr_a/pr_a = dr_b/pr_b$$

where $dr_a$ is the distance of the liquid crystal molecules above the electrode for reflective display from the surface of the substrate where the molecules make contact and the pixel electrodes are not located, $pr_a$ is the twist angle of the liquid crystal molecules, $dr_b$ is the distance of the liquid crystal molecules above the electrode for transmissive display from the surface of the substrate where the molecules make contact and the pixel electrodes are not located, and $pr_b$ is the twist angle of the liquid crystal molecules.

20. The transflective liquid crystal display device according to claim 19, wherein the color filter layer is for transmitting a peak wavelength of a bright-line spectrum substantially corresponding to a wavelength at which transmittance of the color filter layer exhibits a peak.

21. The transflective liquid crystal display device according to claim 19, wherein the color filter layer is located in a region including a path of the white light.

22. A transflective liquid crystal display device comprising:
- a pair of substrates;
- a liquid crystal layer sandwiched between the substrates;
- pixel electrodes located on a surface of one of the substrates facing the liquid crystal layer, each of the pixel electrodes comprising an electrode for reflective display and an electrode for transmissive display;
- a counter electrode located on a surface of the other substrate facing the liquid crystal layer;
- an alignment film covering the surface of each of the substrates facing the liquid crystal layer;
- a color filter layer located so as to oppose to the electrode for reflective display;
- a light source for irradiating the liquid crystal layer with light through the electrode for transmissive display; and
- a light guiding plate for propagating light to the liquid crystal layer through the substrate having located thereon the electrode for transmissive display, the light being irradiated from the light source;

wherein a distance from the electrode for transmissive display to the other substrate is different from a distance from the electrode for reflective display to the other substrate;

wherein liquid crystal molecules at a surface of the electrode for reflective display are aligned in a same direction as liquid crystal molecules above the electrode for transmissive display that are in a same plane as the liquid crystal molecules above the electrode for reflective display, the plane being parallel to principal surfaces of the substrates; and wherein a relation between $dr_a$ and $pr_a$ and $dr_b$ and $pr_b$ is expressed by the following equation:

$$dr_a/pr_a = dr_b/pr_b$$

where $dr_a$ is the distance of the liquid crystal molecules above the electrode for reflective display from the surface of the substrate where the molecules make contact and the pixel electrodes are not located, $pr_a$ is the twist angle of the liquid crystal molecules, $dr_b$ is the distance of the liquid crystal molecules above the electrode for transmissive display from the surface of the substrate where the molecules make contact and the pixel electrodes are not located, and $pr_b$ is the twist angle of the liquid crystal molecules; and wherein the light guiding plate is for selectively emitting light to a region including the electrode for transmissive display.

23. A transflective liquid crystal display device comprising:
- a pair of substrates;
- a liquid crystal layer sandwiched between the substrates;
- pixel electrodes located on a surface of one of the substrates facing the liquid crystal layer, each of the pixel electrodes comprising an electrode for reflective display and an electrode for transmissive display;
- a counter electrode located on a surface of the other substrate facing the liquid crystal layer;
- an alignment film covering the surface of each of the substrates facing the liquid crystal layer;
- a color filter layer located so as to oppose to the electrode for reflective display;
- a light source for irradiating the liquid crystal layer with light through the electrode for transmissive display; and
- a light guiding plate for propagating light to the liquid crystal layer through the substrate having located thereon the electrode for transmissive display, the light being irradiated from the light source;
- wherein a distance from the electrode for transmissive display to the other substrate is different from a distance from the electrode for reflective display to the other substrate;
- wherein liquid crystal molecules at a surface of the electrode for reflective display are aligned in a same direction as liquid crystal molecules above the electrode for transmissive display that are in a same plane as the liquid crystal molecules above the electrode for reflective display, the plane being parallel to principal surfaces of the substrates; and
- wherein a relation between $dr_a$ and $pr_a$ and $dr_b$ and $pr_b$ is expressed by the following equation:

$$dr_a/pr_a = dr_b/pr_b$$

where $dr_a$ is the distance of the liquid crystal molecules above the electrode for reflective display from the surface of the substrate where the molecules make contact and the pixel electrodes are not located, $pr_a$ is the twist angle of the liquid crystal molecules, $dr_b$ is the distance of the liquid crystal molecules above the electrode for transmissive display from the surface of the substrate where the molecules make contact and the pixel electrodes are not located, and $pr_b$ is the twist angle of the liquid crystal molecules; and

- wherein the substrates are each made of a synthetic resin and the color filter layer is located on a surface of one of the substrates on a side not facing the liquid crystal layer.

* * * * *

UNITED STATES PATENT AND TRADEMARK OFFICE
CERTIFICATE OF CORRECTION

PATENT NO.     : 6,836,306 B2
DATED          : December 28, 2004
INVENTOR(S)    : Hirofumi Kubota et al.

It is certified that error appears in the above-identified patent and that said Letters Patent is hereby corrected as shown below:

Column 19,
Line 12, change "$dr_b$" to -- $pr_b$ --; and
Line 25, change "$dr_b$" to -- $pr_b$ --.

Signed and Sealed this

Twenty-sixth Day of April, 2005

JON W. DUDAS
*Director of the United States Patent and Trademark Office*